United States Patent
Höglund et al.

(10) Patent No.: US 11,310,739 B2
(45) Date of Patent: Apr. 19, 2022

(54) MOBILITY ROBUSTNESS FOR DISCONTINUOUS RECEPTION WAKE UP SIGNAL

(71) Applicant: Telefonaktiebolaget LM Ericsson (publ), Stockholm (SE)

(72) Inventors: Andreas Höglund, Solna (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/649,728

(22) PCT Filed: Sep. 26, 2018

(86) PCT No.: PCT/IB2018/057471
§ 371 (c)(1),
(2) Date: Mar. 23, 2020

(87) PCT Pub. No.: WO2019/064208
PCT Pub. Date: Apr. 4, 2019

(65) Prior Publication Data
US 2020/0280919 A1 Sep. 3, 2020

Related U.S. Application Data

(60) Provisional application No. 62/564,825, filed on Sep. 28, 2017.

(51) Int. Cl.
*H04W 52/02* (2009.01)
*H04W 76/28* (2018.01)
*H04W 24/08* (2009.01)
*H04W 68/00* (2009.01)

(52) U.S. Cl.
CPC ....... *H04W 52/0229* (2013.01); *H04W 24/08* (2013.01); *H04W 68/005* (2013.01); *H04W 76/28* (2018.02)

(58) Field of Classification Search
CPC .............. H04W 68/005; H04W 76/28; H04W 52/0229; H04W 24/08; H04W 52/0216; Y02D 30/70
See application file for complete search history.

(56) References Cited

U.S. PATENT DOCUMENTS

| | | | |
|---|---|---|---|
| 2016/0330791 A1 | 11/2016 | Vajapeyam et al. | |
| 2017/0006549 A1* | 1/2017 | Deivasigamani ... | H04W 52/028 |
| 2019/0313475 A1* | 10/2019 | Siomina ................ | H04W 76/28 |
| 2020/0404620 A1* | 12/2020 | Sang ..................... | H04W 68/06 |

OTHER PUBLICATIONS

Examination Report issued by Intellectual Property India for Application No. 202047013807—dated May 7, 2021.
3GPP TSG RAN WG2 Meeting #91 bis; Malmo, Sweden; Source: Sierra Wireless; Title: Considerations for loose paging occasion synchronism between eNBs (R2-154279)—Oct. 5-9, 2015.
PCT International Search Report issued for International application No. PCT/IB2018/057471—dated Jan. 28, 2019.
PCT Written Opinion of the International Searching Authority for International application No. PCT/IB2018/057471—dated Jan. 28, 2019.
EPO Communication Pursuant to Article 94(3) EPC issued for Application No. 18 789 481.1-1205—dated Jul. 30, 2021.

* cited by examiner

*Primary Examiner* — Diane D Mizrahi
(74) *Attorney, Agent, or Firm* — Baker Botts, LLP

(57) ABSTRACT

According to an embodiment, a method for use in a wireless device is provided. The method comprises waking up from a discontinuous reception (DRX) mode in a cell. The method further comprises determining whether the cell is the same as a previous cell of the wireless device. In response to determining that the cell is not the same as the previous cell, the method further comprises determining whether the wireless device missed a wake-up signal opportunity in the cell. The method further comprises monitoring each of the paging occasions associated with the wake-up signal opportunity if the cell is not the same as the previous cell and the wake-up signal opportunity was missed.

20 Claims, 10 Drawing Sheets

US 11,310,739 B2

MOBILITY ROBUSTNESS FOR DISCONTINUOUS RECEPTION WAKE UP SIGNAL

PRIORITY

This nonprovisional application is a U.S. National Stage Filing under 35 U.S.C. § 371 of International Patent Application Serial No. PCT/IB2018/057471 filed Sep. 26, 2018 and entitled "MOBILITY ROBUSTNESS FOR DISCONTINOUS RECEPTION WAKE UP SIGNAL" which claims priority to U.S. Provisional Patent Application No. 62/564,825 filed Sep. 28, 2017 both of which are hereby incorporated by reference in their entirety.

TECHNICAL FIELD

The present disclosure relates, in general, to wireless communications and, more particularly, to enhancing the performance of discontinuous reception wake up in wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There has been a lot of work in 3rd Generation Partnership Project (3GPP) lately on specifying technologies to cover Machine-to-Machine (M2M) and/or Internet of Things (IoT) related use cases. Most recent work for 3GPP Release 13 and 14 includes enhancements to support Machine-Type Communications (MTC) with new UE categories (Cat-M1, Cat-M2), supporting reduced bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2).

We will refer to the Long-Term Evolution (LTE) enhancements introduced in 3GPP Release 13, 14 and 15 for MTC as "eMTC", including (not limiting) support for bandwidth limited UEs, Cat-M1, and support for coverage enhancements. This is to separate discussion from NB-IoT (notation here used for any Release), although the supported features are similar on a general level.

There are multiple differences between "legacy" LTE and the procedures and channels defined for eMTC and for NB-IoT. Some important differences include new physical channels, such as the physical downlink control channels, called MPDCCH in eMTC and NPDCCH in NB-IoT, and a new physical random access channel, NPRACH, for NB-IoT.

In Release 15, there is a common WI objective in the approved work items (WI) for both NB-IoT and Rel-15 enhancements for eMTC. The description for NB-IoT is as follows:

A. Work on the following objectives to commence from RAN#75 (according to TU allocation per WG) and strive for completion by RAN#78:
Further latency and power consumption reduction
Power consumption reduction for physical channels
  Study and, if found beneficial, specify for idle mode paging and/or connected mode DRX, physical signal/channel that can be efficiently decoded or detected prior to decoding NPDCCH/NPDSCH. [RAN1, RAN2, RAN4]

And with a similar formulation for eMTC:
Improved power consumption:
Power consumption reduction for physical channels [RAN1 lead, RAN2, RAN4]
Study and, if found beneficial for idle mode paging and/or connected mode DRX, specify physical signal/channel that can be efficiently decoded or detected prior to decoding the physical downlink control/data channel.

So far, the topic has been discussed in two RAN1 meetings and most recently in RAN1#89 where it was agreed for both NB-IoT and eMTC that:

A physical signal/channel indicating whether the UE needs to decode subsequent physical channel(s) is introduced, at least for idle mode paging. Candidates for the signal/channel are:
Wake-up signal or Discontinuous Transmission (DTX)
Go-to-sleep signal or DTX
Wake-up signal with no DTX
Downlink control information
For Further Study (FFS) whether synchronization to the camped-on cell is assumed for detecting/decoding WUS/GTS, depending on the extended Discontinuous Reception ((e)DRX) cycle length
Design details are FFS
Connected mode DRX is FFS The 'Wake-up signal' and 'Go-to-sleep signal' solutions are based on the transmission of a short signal which would indicate to the UE whether or not it would have to continue to decode the full MPDCCH (eMTC) or NPDCCH (NB-IoT). The decoding time for the former signal is considerably shorter than full MPDCCH or NPDCCH which gives a reduced UE power consumption and longer battery life (this is illustrated in FIG. 1 from R1-1706887, included herein by reference). The 'Wake-up signal' (WUS) would be transmitted only when there is paging for the UE; if there is not, the WUS will not be transmitted (the meaning of DTX in the above agreement) and the UE would go back to sleep. The 'Go-to-sleep signal' (GTS) would be transmitted only when there is not any paging for the UE; if there is, the GTS will not be transmitted (the meaning of DTX in the above agreement) and the UE would continue to decode NPDCCH or MPDCCH.

In RAN1#90 the following working assumption was agreed:
For idle mode,
  In specifying a power saving physical signal to indicate whether the UE needs to decode subsequent physical channel(s) for idle mode paging, select a candidate among the following power saving physical signals:
    Wake-up signal or DTX
    Wake-up signal with no DTX
  Out of these two remaining options it seems most likely at this point that the first will eventually be adopted.

So far, the topic has not been discussed in RAN2 but most recently the following was agreed in RAN1#90:

For idle mode,
  The power saving signal in a cell supports being applied to FFS between:
    a) All the UEs associated to a PO in the cell
    b) A group of more than one of the UEs associated to a PO in the cell
    c) Both (a) and (b)
  How many POs the power saving signal applies to from the UE perspective is FFS between
    a) A single PO only
    b) One or more than one PO (details are FFS)
  How many POs the power saving signal applies to from the eNB perspective is FFS between
    a) A single PO only
    b) One or more than one PO (details are FFS)
  The power saving signal applicable to a UE is sent on the same paging carrier as the associated subsequent physical channel(s)

There currently exist certain challenges. With regards to the above agreement "How many POs the power saving signal applies to from the UE perspective is FFS" it has been suggested that for eDRX the wake-up signal (WUS) could apply to all the paging occasions (POs) inside one Paging Time Window (PTW), for example in R2-1708284 and R2-1708285, included herein by reference. The problem is that the multiple POs in the PTW are provided in order to have increased robustness for mobile UEs using a WUS-per-PTW could jeopardize this. A further problem is that it might be desired for the UE to be reached be escalated paging within the same PTW. That is, a resource saving strategy for an MME when paging a UE is to start paging it in the last known cell for the first PO, then to expand to more cells in a later PO if there is no response, and eventually page the UE in the entire Tracking Area. This paging escalation could not be performed in the same PTW with WUS-per-PTW.

Certain aspects of the present disclosure and their embodiments may provide solutions to these or other challenges.

SUMMARY

According to an embodiment, a method for use in a wireless device is provided. The method comprises waking up from a discontinuous reception (DRX) mode in a cell. The method further comprises determining whether the cell is the same as a previous cell of the wireless device. In response to determining that the cell is not the same as the previous cell, the method further comprises determining whether the wireless device missed a wake-up signal opportunity in the cell. The method further comprises monitoring each of the paging occasions associated with the wake-up signal opportunity if the cell is not the same as the previous cell and the wake-up signal opportunity was missed.

According to another embodiment, a wireless device comprises memory and processing circuitry. The memory is operable to store instructions. The processing circuitry is operable to execute the instructions. The wireless device is operable to wake up from a discontinuous reception (DRX) mode in a cell. The wireless device is further operable to determine whether the cell is the same as a previous cell of the wireless device. In response to determining that the cell is not the same as the previous cell, the wireless device is further operable to determine whether the wireless device missed a wake-up signal opportunity in the cell. The wireless device is further operable to monitor each of the paging occasions associated with the wake-up signal opportunity if the cell is not the same as the previous cell and the wake-up signal opportunity was missed.

According to yet another embodiment, a computer program product comprises a non-transitory computer readable medium (QQ130, QQ215, QQ390-1, QQ390-2) storing computer readable program code. The computer readable program code comprises program code for waking up from a discontinuous reception (DRX) mode in a cell. The computer readable program code further comprises program code for determining whether the cell is the same as a previous cell of the wireless device. The computer readable program code further comprises program code for, in response to determining that the cell is not the same as the previous cell, determining whether the wireless device missed a wake-up signal opportunity in the cell. The computer readable program code further comprises program code for monitoring each of the paging occasions associated with the wake-up signal opportunity if the cell is not the same as the previous cell and the wake-up signal opportunity was missed.

The above-described method, wireless device, and/or computer program code may include various other features, including any one or more of the following:

In certain embodiments, monitoring each of the paging occasions associated with the wake-up signal opportunity comprises monitoring one or more of the paging occasions associated with a paging time window according to LTE Release 13.

In certain embodiments, the method/wireless device/computer program code further comprises detecting a wake-up signal during the wake-up signal opportunity and monitoring the paging occasions associated with the wake-up signal.

In certain embodiments, the method/wireless device/computer program code further comprises re-entering the DRX mode if no paging message is detected during the monitored paging occasions.

In certain embodiments, the method/wireless device/computer program code further comprises establishing a connection with the cell upon detecting a paging message for the wireless device during the monitored paging occasions.

In certain embodiments, determining whether the cell is the same as the previous cell is based on whether the previous cell was the last cell in which the wireless device reported a tracking area update.

In certain embodiments, determining whether the cell is the same as the previous cell is based on whether the previous cell was the last serving cell of the wireless device.

In certain embodiments, determining whether the cell is the same as the previous cell is based on whether the wireless device is determined to have remained stationary.

In certain embodiments, the DRX mode is an extended DRX (eDRX) mode.

In certain embodiments, the method/wireless device/computer program code further comprises abstaining from monitoring any paging occasions associated with the paging time window if the cell is the same as the previous cell and no wake-up signal was detected prior to the paging time window.

In certain embodiments, the method/wireless device/computer program code further comprises monitoring each of the paging occasions associated with the paging time window if the cell is the same as the previous cell and the wake-up signal was detected prior to the paging time window.

According to an embodiment, a method for use in a network node is provided. The method comprises determining whether a previous cell of the wireless device belongs to the network node. Upon determining that the previous cell of the wireless device belongs to the network node, the method further comprises paging the wireless device using a wake-up signal. Upon determining that the previous cell of the wireless device does not belong to the network node, the method further comprises paging the wireless device without using a wake-up signal.

According to another embodiment, a network node comprises memory and processing circuitry. The memory is operable to store instructions. The processing circuitry is operable to execute the instructions. The network node is operable to determine whether a previous cell of the wireless device belongs to the network node. Upon determining that the previous cell of the wireless device belongs to the network node, the network node is further operable to page the wireless device using a wake-up signal. Upon determining that the previous cell of the wireless device does not belong to the network node, the network node is further operable to page the wireless device without using a wake-up signal.

According to yet another embodiment, a computer program product comprises a non-transitory computer readable medium storing computer readable program code. The computer readable program code comprises program code for determining whether a previous cell of the wireless device belongs to the network node. The computer readable program code further comprises program code for, upon determining that the previous cell of the wireless device belongs to the network node, paging the wireless device using a wake-up signal. The computer readable program code further comprises program code for, upon determining that the previous cell of the wireless device does not belong to the network node, paging the wireless device without using a wake-up signal.

The above-described method, network node, and/or computer program code may include various other features, including any one or more of the following:

In certain embodiments, determining whether the previous cell of the wireless device belongs to the network node is based on whether the network node belongs to the last cell in which the wireless device reported a tracking area update.

In certain embodiments, determining whether the previous cell of the wireless device belongs to the network node is based on whether the network node belongs to the last serving cell of the wireless device.

In certain embodiments, determining whether the previous cell of the wireless device belongs to the network node is based on whether the wireless device is determined to have remained stationary.

In certain embodiments, the method/network node/computer program code further comprises failing to receive a response to the paging and triggering an escalation of paging such that the paging of the wireless device is performed in additional cells of the network node or other network nodes.

Certain embodiments may provide one or more technical advantages. For example, in certain embodiments, an automatic fallback to Rel-13 behavior may be provided for mobile eDRX UEs, under certain conditions, such that the problems described above are avoided and it is ensured that there is no reduction in paging robustness for mobile UEs using WUS-per-PTW. As another example, if WUS is not detected prior to its PTW, certain embodiments only allow eDRX UEs to omit monitoring all POs inside the PTW if it remains the in the same cell/last known cell. As yet another example, in case of the paging escalation, certain embodiments enable the S1 Paging message to provide an indication of escalation or paging re-attempt triggered by the MME to increase the paging scope. In this case, the eNB may insert WUS ahead of each POs in the PTW. In this manner, an automatic fallback to Rel-13 behavior may be provided such that any mobility robustness drawbacks are completely removed. Accordingly, the introduction of WUS-per-PTW would then only give gains for UE power consumption reduction and no negative side effects. Certain embodiments covered in this disclosure may have any or none of the advantages described above. Other technical advantages may be apparent in the remainder of the disclosure.

BRIEF DESCRIPTION OF THE DRAWINGS

For a more complete understanding of the disclosed embodiments and their features and advantages, reference is now made to the following description, taking in conjunction with the accompanying drawings, in which.

DETAILED DESCRIPTION

Figure 1:
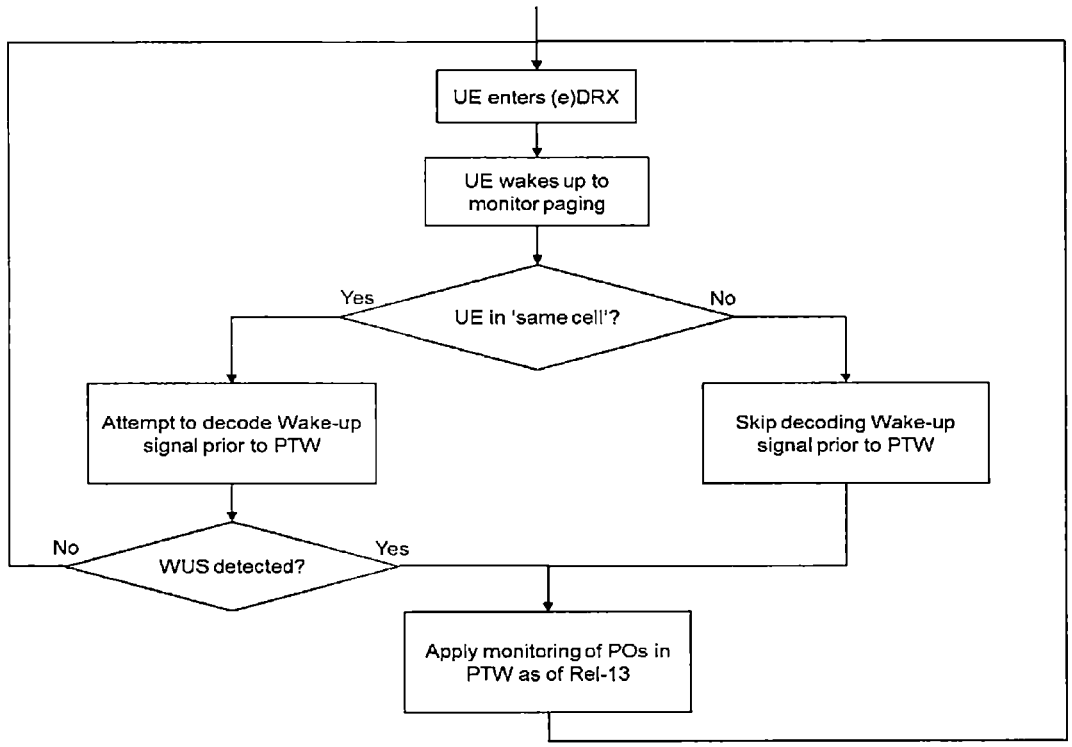
FIG. 1 is a flowchart diagram illustrating an example method in a wireless device in a discontinuous reception mode, in accordance with certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Discontinuous Reception (DRX) is a feature introduced in Release 13 for LTE (including both eMTC and NB-IoT) where the UE does not continuously monitor (N)PDCCH but have periods of discontinuous reception (i.e. sleep) which is coordinated between the UE and the network. The eDRX solution provides much longer DRX-cycles and hence longer battery life than regular DRX operation, e.g., up to 43 minutes for eMTC and up to 3 hours for NB-IoT. The biggest conceptual difference from regular DRX operation is perhaps the use of the paging time window (PTW). That is, to increase robustness for mobility etc. the UE monitors several POs within the PTW which occurs every eDRX cycle. Inside the PTW the UE applies the regular DRX cycle and the length of the PTW is configurable.

In certain embodiments, a single WUS-per-PTW as proposed in application U.S. 62/543,648, hereby incorporated by reference. In such cases, the lack of a WUS prior to PTW may be interpreted by UEs configured with eDRX to omit the entire PTW and go back to sleep (DRX).

Configuring a long PTW with multiple POs can have advantages for mobility robustness:

1) Ensuring the UE monitors at least some POs: In eDRX eNB are required to have "loose synchronization" on a second-scale. This ensures that PTWs in different cells are at least partially overlapping. It would therefore be ensured that an eDRX UE which wakes up in a new cell would therefore be able to monitor at least some of the last POs in the PTW.

2) Ensuring UEs can be found by the network: It might be desired for the UE to be reached by escalated paging within the same PTW. That is, a resource saving strategy for an MME when paging a UE is to start paging it in the last known cell for the first PO, then to expand the paging to more cells in a later PO if there is no response, and eventually page the UE in the entire Tracking Area.

If an eDRX UE configured with WUS-per-PTW goes back to sleep(DRX) after the detection of WUS prior to the PTW, 1) above would not work. Certain embodiments disclosed herein provide that if a UE does not wake up in the 'same cell,' the UE may monitor every PO in the PTW as of Release-13 operation. According to other embodiments, if the UE misses the WUS opportunity in the new cell, e.g. because the PTW is starting earlier than in the original cell due to the "loose synchronization", the UE may monitor every PO in the PTW as of Release-13 operation.

If an eDRX UE configured with WUS-per-PTW goes back to sleep(DRX) after the detection of WUS prior to the PTW, 2) above would not work. The network would have to ensure that the WUS is sent before the PTW in all cells it intends to escalate the paging to (possibly the entire Tracking Area). This is a waste of resources since most of the time UEs are located in the last known cell. Escalating the paging area over several PTWs is a possible solution but not a good one since it would take N×3 hours (where N is natural number). In certain embodiments, a UE which does not wake up in the 'same cell' monitors every PO in the PTW as of Release-13 operation.

Figure 2:
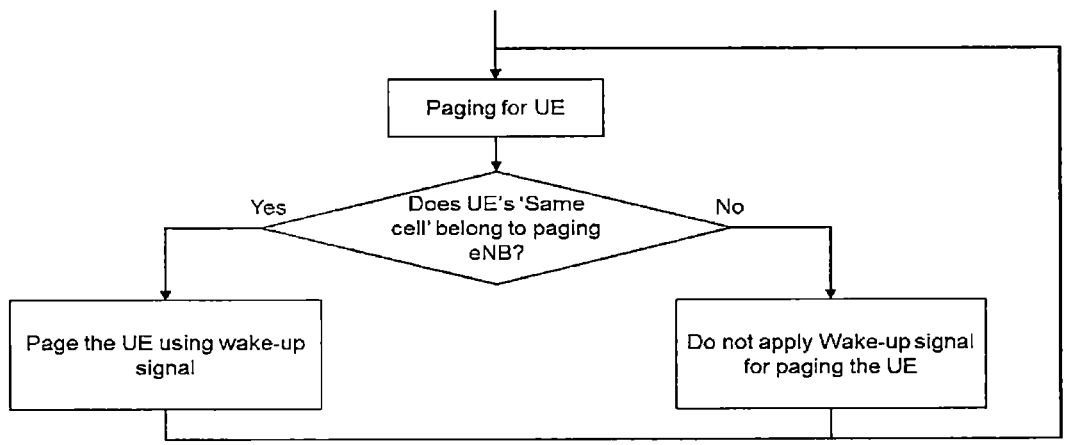
FIG. 2 is a flowchart diagram illustrating an example method in a network node for transmitting wake up signals, in accordance with certain embodiments.

The 'same cell' above can be defined as any of the following:
  The last cell in which the UE reported Tracking Area Update (UE and MME has common knowledge of this).
  The last serving eNB/cell (UE and MME has common knowledge of this).
  Any requirement for the UE to be regarded as 'stationary'
A flowchart for the UE procedure is shown in FIG. 1, and for the network procedure in FIG. 2.

There is provided an example method for extending battery life of a user equipment (UE), executed by the UE, comprising:
  the UE entering extended discontinuous reception (e)DRX;
  the UE waking up and monitoring paging;
  upon determination that the UE is in a same cell as before, attempting to decode a wake-up signal (WUS) prior to a paging time window (PTW) and, if a WUS is detected, applying a monitoring of paging occasions (POs) in the PTW; and
  upon determination that the UE is not in the same cell as before, skipping decoding the WUS prior to PTW and applying a monitoring of paging occasions (POs) in the PTW.

There is provided an example user equipment (UE), operative to extend life of power supply circuitry configured to supply power to the UE, the UE comprising a memory and processing circuitry configured to:
  enter extended discontinuous reception (e)DRX;
  wake up and monitor paging;
  determine that the UE is in a same cell as before, attempt to decode a wake-up signal (WUS) prior to a paging time window (PTW) and, if a WUS is detected, apply a monitoring of paging occasions (POs) in the PTW; and
  determine that the UE is not in the same cell as before, skip decoding the WUS prior to PTW and apply a monitoring of paging occasions (POs) in the PTW.

There is provided an example method for extending battery life of a user equipment (UE), executed by a network node, comprising:
  paging the UE;
  upon determination that the UE, which is in a same cell as previously, belongs to the network node, paging the UE using a wake-up signal (WUS); and
  upon determination that the UE, which is in the same cell as previously, does not belong to the network node, paging the UE without using a WUS.

In certain embodiments, the network node is an Evolved Universal Terrestrial Radio Access Network NodeB (eNB).

There is provided an example base station operative to extend life of power supply circuitry configured to supply power to a UE, the base station comprising a memory and processing circuitry configured to:
  page the UE;
  determine that the UE, which is in a same cell as previously, belongs to the network node and page the UE using a wake-up signal (WUS); and
  determine that the UE, which is in the same cell as previously, does not belong to the network node and page the UE without using a WUS.

In some embodiments, the base station, wherein the base station is an Evolved Universal Terrestrial Radio Access Network NodeB (eNB).

In certain embodiments, there is provided a communication system including a user equipment and a base station as described above.

In certain embodiments, if paging escalation is detected, the base station receives a paging message, from a Mobility Management Entity (MME), providing an indication to increase the paging scope.

In certain embodiments, if paging escalation is detected, the base station inserts WUS ahead of each POs in the PTW.

According to certain embodiments, a second example method is provided for extending battery life of a user equipment (UE), executed by the UE, comprising:
- the UE entering discontinuous reception;
- the UE waking up;
- upon determination that the UE has not changed cell, attempting to decode a wake-up signal (WUS) prior to further processing; and
- upon determination that the UE has changed cell, skipping decoding the WUS prior to further processing.

Figure 3:
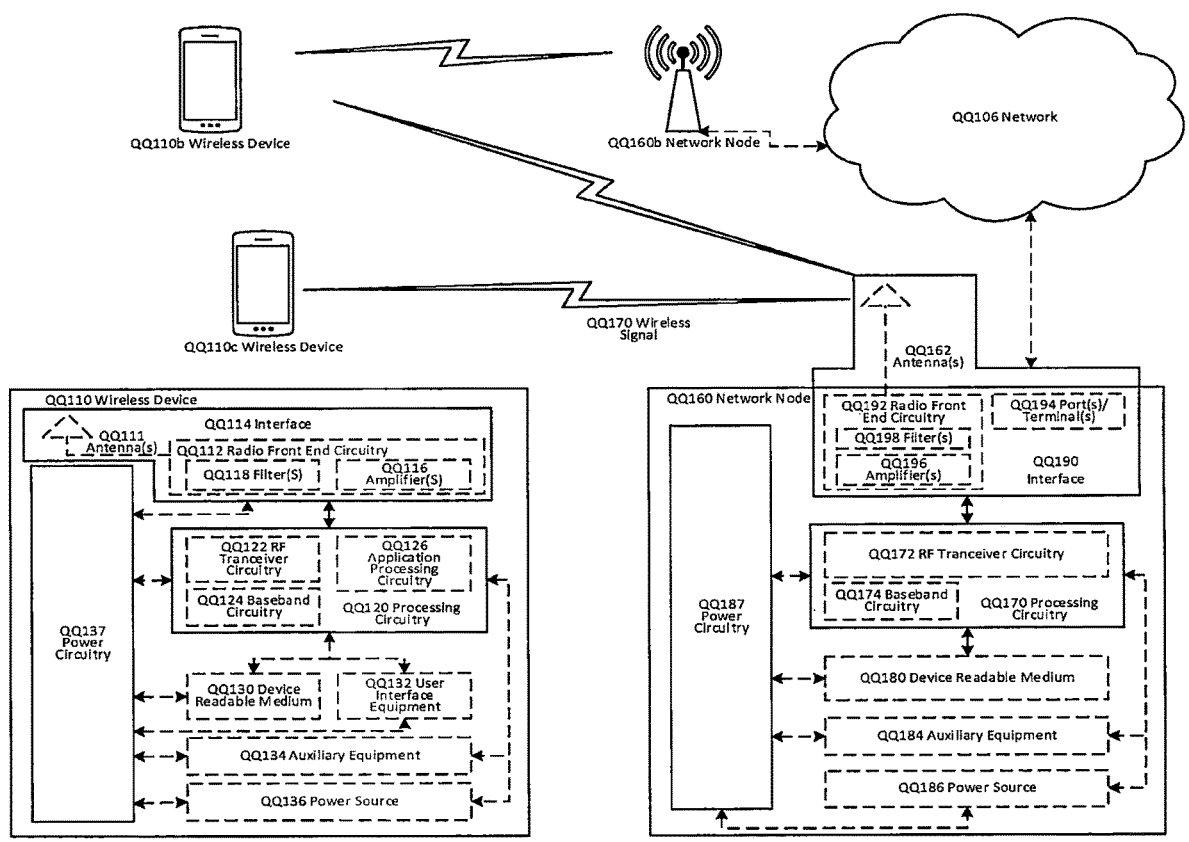
FIG. 3 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAN1), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 3 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 4:
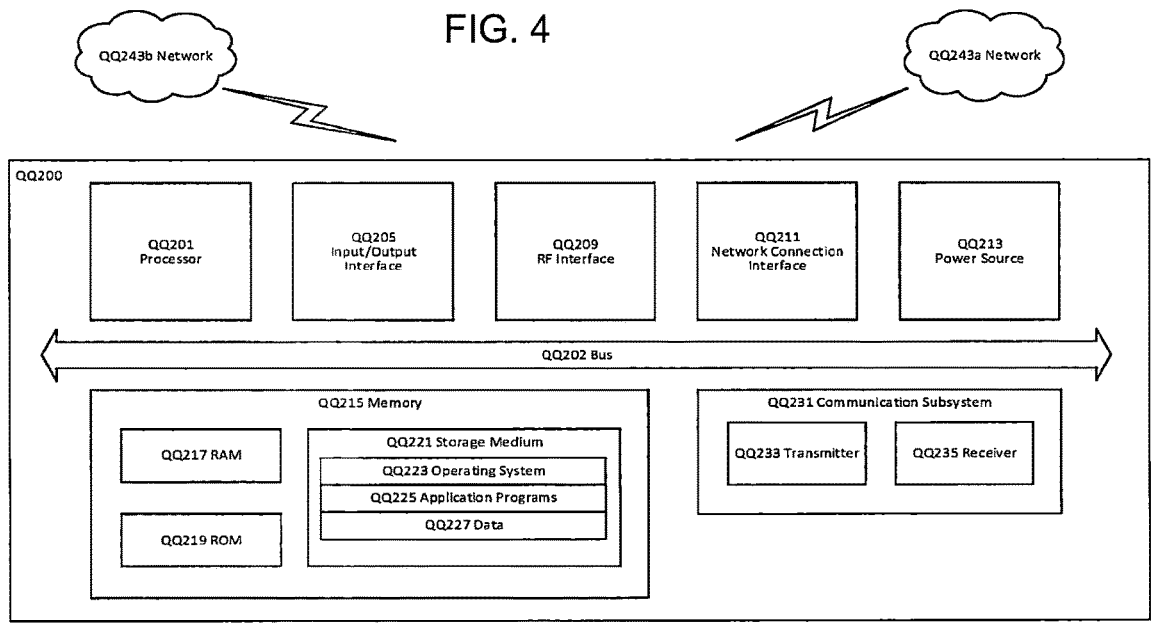
FIG. 4 illustrates an example user equipment, in accordance with certain embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3$^{rd}$ Generation Partnership Project (3GPP), including a NB-IoT UE that is not intended for sale to, or operation by, a human user. UE QQ200, as illustrated in FIG. 4, is one example of a WD configured for communication in accordance with one or more communication standards promulgated by the 3$^{rd}$ Generation Partnership Project (3GPP), such as 3GPP's GSM, UNITS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 4, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 5:
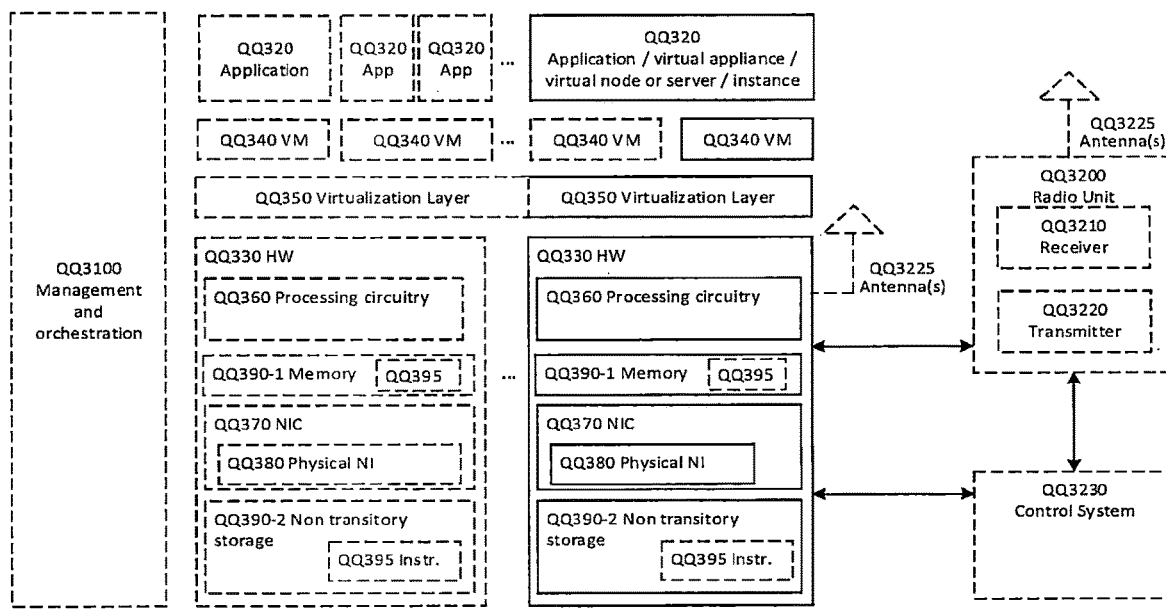
FIG. 5 illustrates an example virtualization environment, in accordance with certain embodiments.

FIG. 5 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 5, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 5.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be affected with the use of control system QQ3230 which may alternatively be used for communication between the hardware nodes QQ330 and radio units QQ3200.

Figure 6:
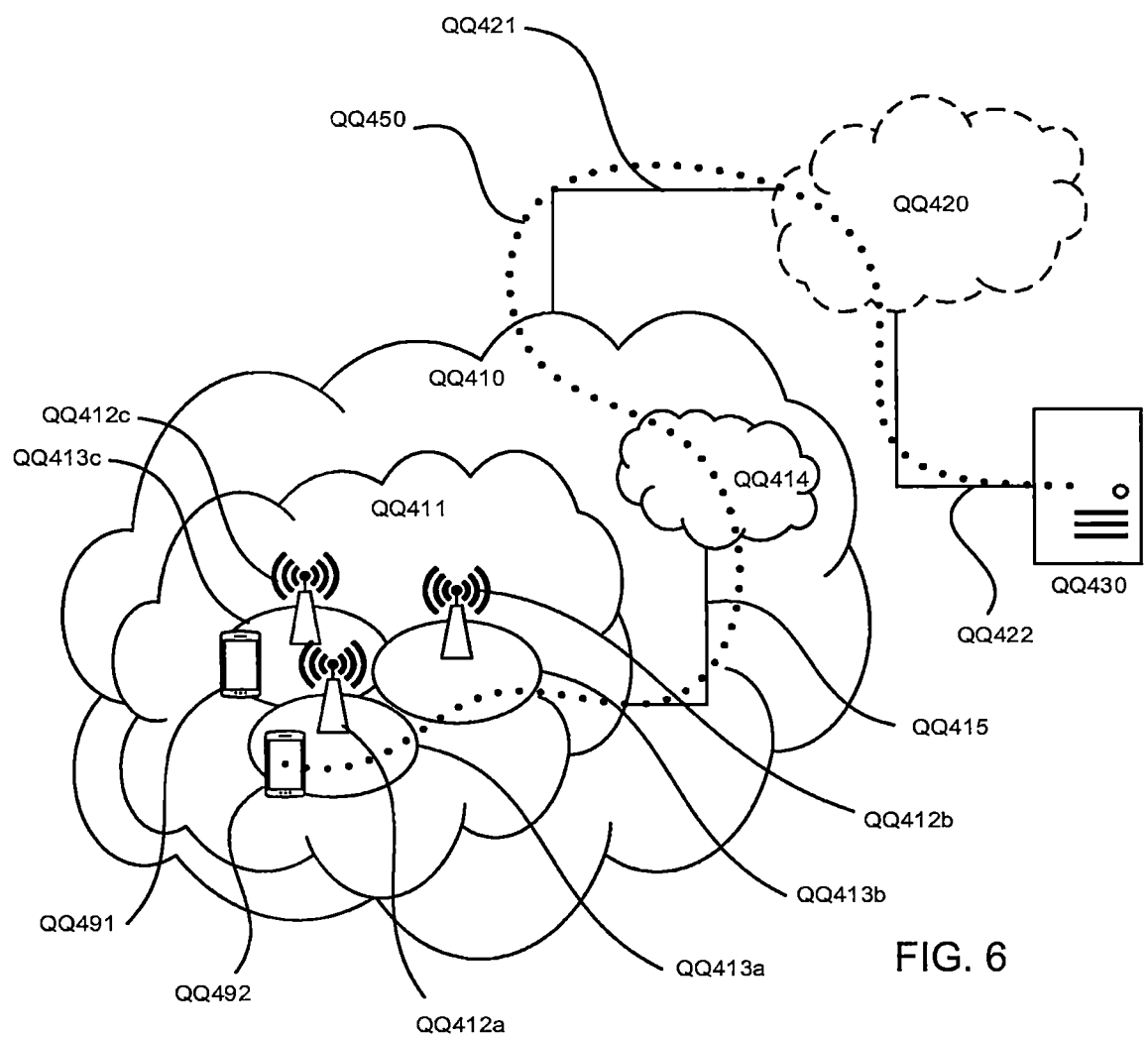
FIG. 6 illustrate an example telecommunication network connected via an intermediate network to a host computer, in accordance with certain embodiments.

With reference to FIG. 6, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 6 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 7. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 7) served by base station QQ520. Communication interface QQ526 may be configured to facilitate connection QQ560 to host computer QQ510. Connection QQ560 may be direct or it may pass through a core network (not shown in FIG. 7) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 7:
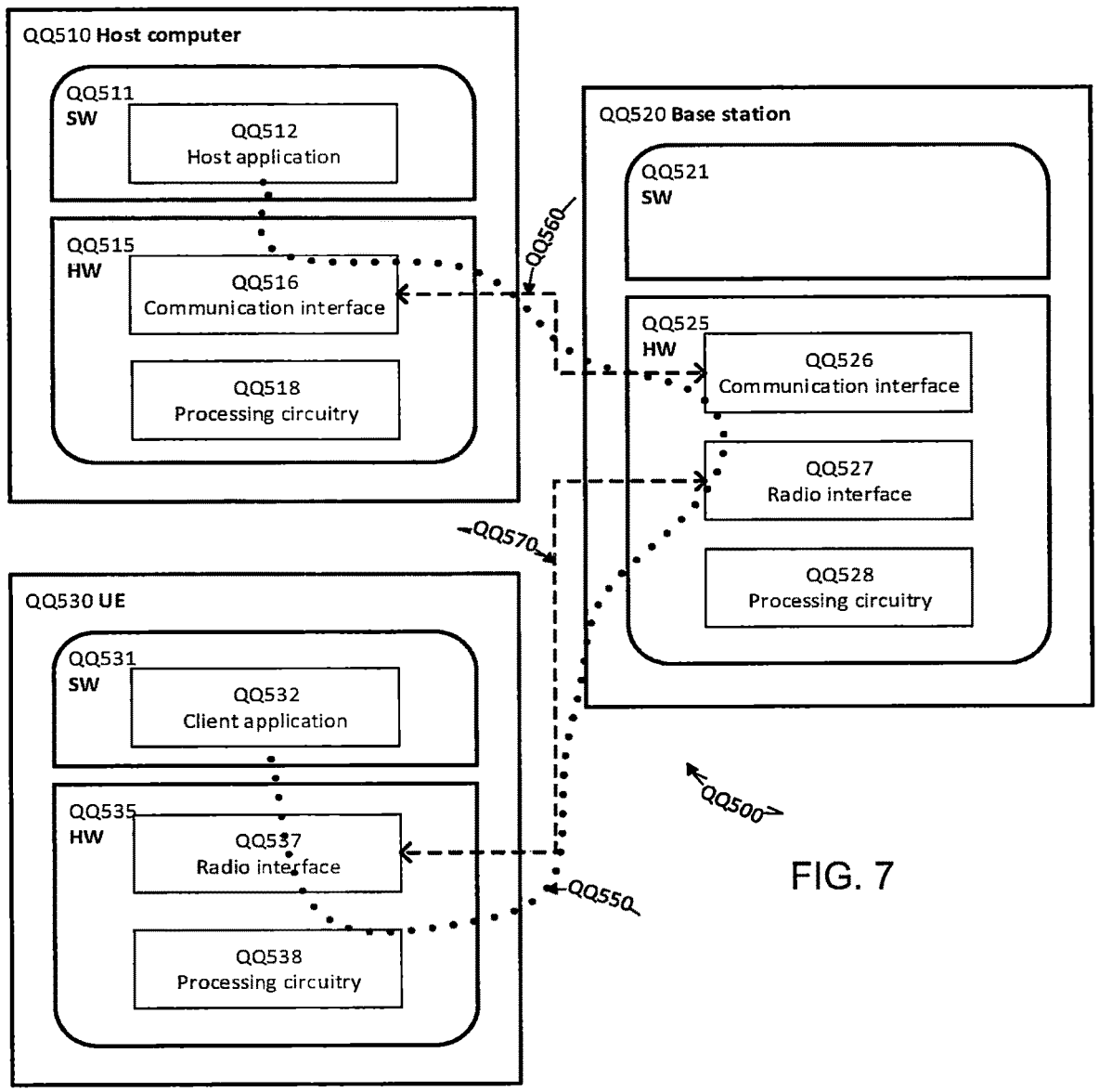
FIG. 7 illustrates an example host computer communicating via a base station with a user equipment over a partially wireless connection, in accordance with certain embodiments.

It is noted that host computer QQ510, base station QQ520 and UE QQ530 illustrated in FIG. 7 may be similar or identical to host computer QQ430, one of base stations QQ412a, QQ412b, QQ412c and one of UEs QQ491, QQ492 of FIG. 6, respectively. This is to say, the inner workings of these entities may be as shown in FIG. 7 and independently, the surrounding network topology may be that of FIG. 6.

In FIG. 7, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the power consumption at the UE and thereby provide benefits such as extended battery life.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 8:
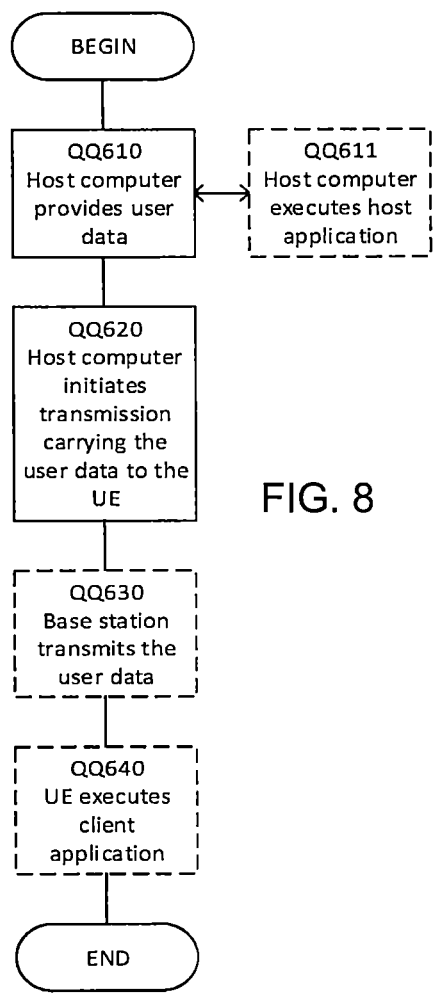
FIG. 8 is a flowchart illustrating an example method implemented in a communication system, in accordance certain embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 9:
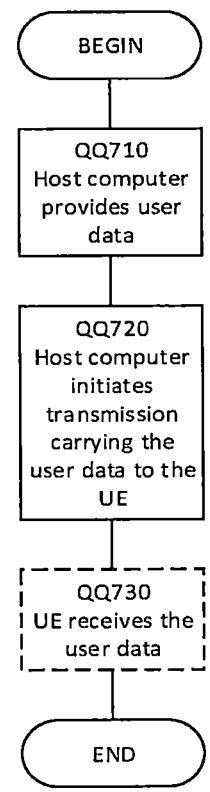
FIG. 9 is a flowchart illustrating a second example method implemented in a communication system, in accordance with certain embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 10:
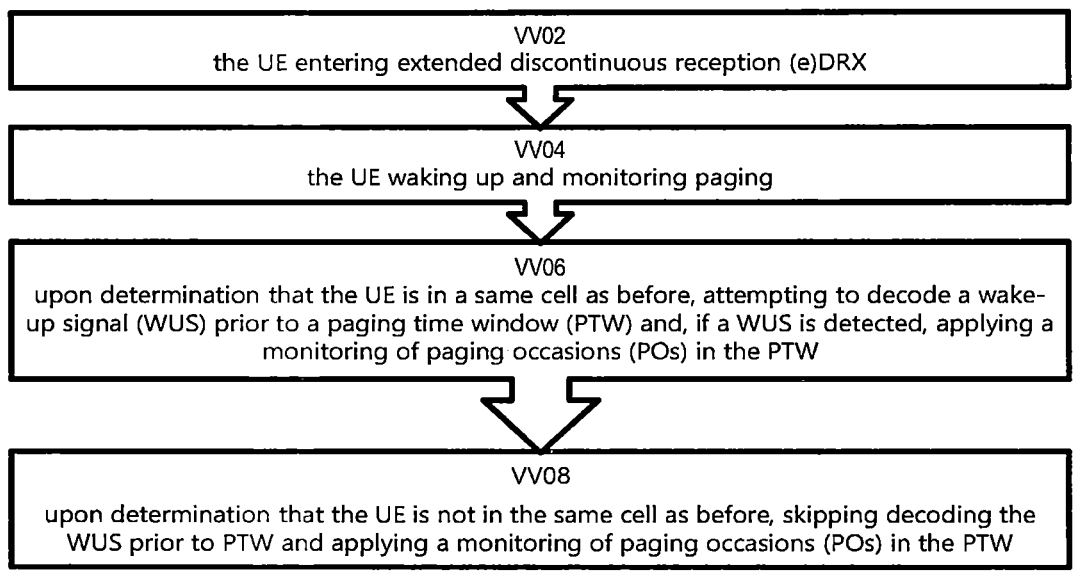
FIG. 10 is a flowchart illustrated a method for use in a wireless device, in accordance with certain embodiments.

FIG. 10 depicts a method in accordance with particular embodiments, the method begins at step VV02 with the UE entering extended discontinuous reception (e)DRX; at step VV04, the UE waking up and monitoring paging; at step VV06, upon determination that the UE is in a same cell as before, attempting to decode a wake-up signal (WUS) prior to a paging time window (PTW) and, if a WUS is detected, applying a monitoring of paging occasions (POs) in the PTW; and at step VV08, upon determination that the UE is not in the same cell as before, skipping decoding the WUS prior to PTW.

Figure 11:
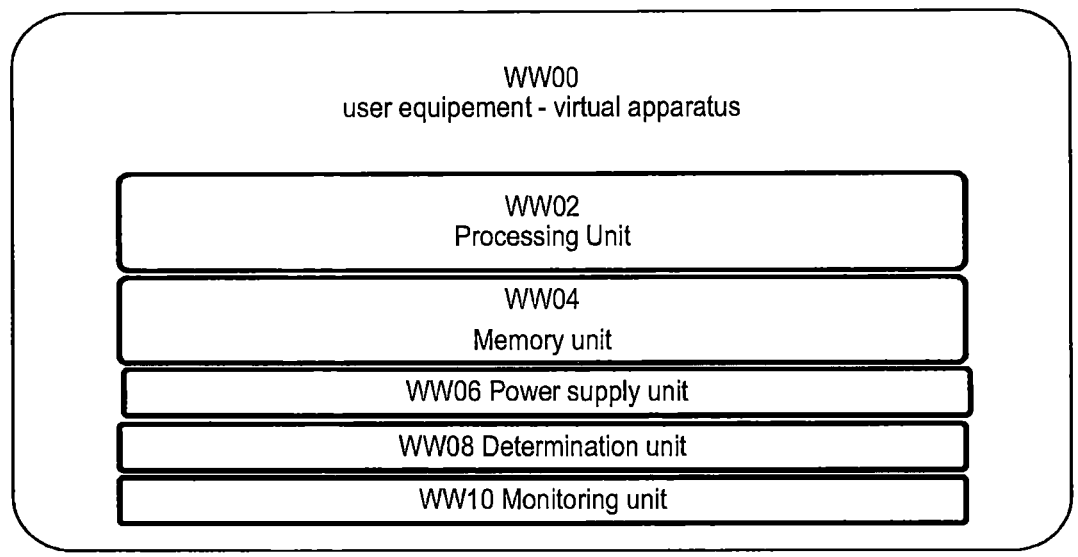
FIG. 11 illustrates an example virtualization apparatus, in accordance with certain embodiments.

FIG. 11 illustrates a schematic block diagram of an apparatus WW00 in a wireless network (for example, the wireless network shown in FIG. 3). The apparatus may be implemented in a wireless device or network node (e.g., wireless device QQ110 or network node QQ160 shown in FIG. 3). Apparatus WW00 is operable to carry out the example method described with reference to FIG. 10 and possibly any other processes or methods disclosed herein. It is also to be understood that the method of FIG. 10 is not necessarily carried out solely by apparatus WW00. At least some operations of the method can be performed by one or more other entities.

Virtual Apparatus WW00 may comprise processing unit WW02 comprising processing circuitry, which may include one or more microprocessor or microcontrollers, as well as other digital hardware, which may include digital signal processors (DSPs), special-purpose digital logic, and the like. The processing circuitry may be configured to execute program code stored in a memory unit WW04 such as a memory, which may include one or several types of memory such as read-only memory (ROM), random-access memory, cache memory, flash memory devices, optical storage devices, etc. Virtual apparatus WW00 may also comprise power supply unit WW06. Program code stored in memory includes program instructions for executing one or more telecommunications and/or data communications protocols as well as instructions for carrying out one or more of the techniques described herein, in several embodiments. In some implementations, the processing circuitry may be used to cause determination unit WW08 and monitoring unit WW10 and any other suitable units of apparatus WW00 to perform corresponding functions according one or more embodiments of the present disclosure.

FIG. 11 illustrates a virtual apparatus user equipment (UE) WW00, operative to extend life of power supply unit WW06 configured to supply power to the UE, the UE comprising a memory unit WW04 and processing unit WW02, the UE WW00 including:
  the processing unit WW02 configured to make the UE enter extended discontinuous reception (e)DRX;
  a monitoring unit WW10 configured to wake up the UE and monitor paging;
  a determination unit WW08 configured to determine that the UE is in a same cell as before, attempt to decode a wake-up signal (WUS) prior to a paging time window (PTW) and, if a WUS is detected, apply a monitoring of paging occasions (POs) in the PTW; and
  the determination unit WW08 further configured to determine that the UE is not in the same cell as before, skip decoding the WUS prior to PTW and apply a monitoring of paging occasions (POs) in the PTW.

A virtual apparatus is also provided for a base station.

Figure 12:
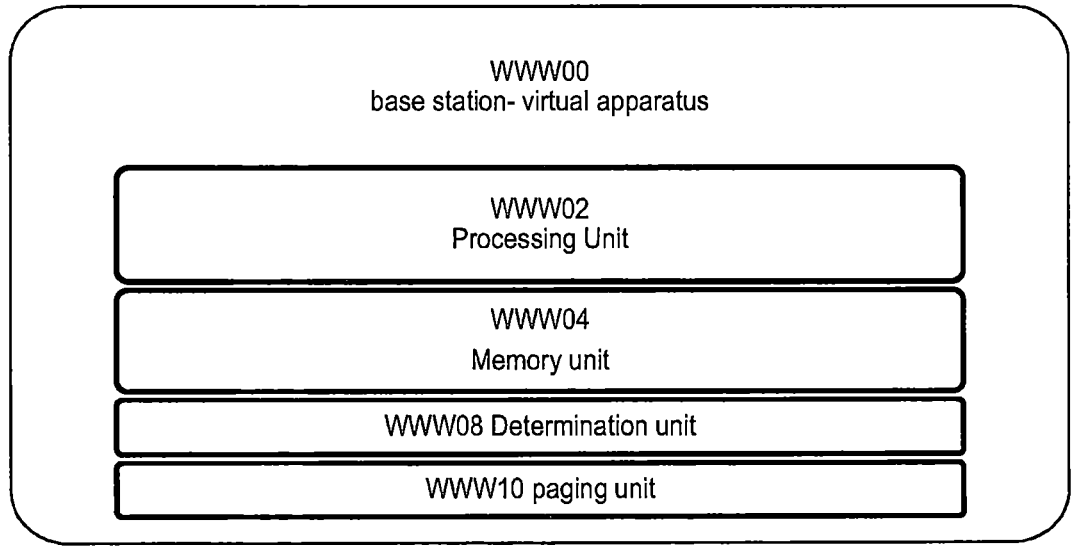
FIG. 12 illustrates another example virtualization apparatus, in accordance with certain embodiments.

FIG. 12 illustrates a virtual apparatus base station WWW00, operative to extend life of a power supply unit configured to supply power to a UE, the base station comprising a memory unit WWW04 and processing unit WWW02, the base station WWW00 including:
  a paging unit WWW10 configured to page the UE;
  a determining unit WWW08 configured to determine that the UE, which is in a same cell as previously, belongs to the network node and page the UE using a wake-up signal (WUS); and
  the determining unit WWW08 is also configured to determine that the UE, which is in the same cell as previously, does not belong to the network node and page the UE without using a WUS.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 13:
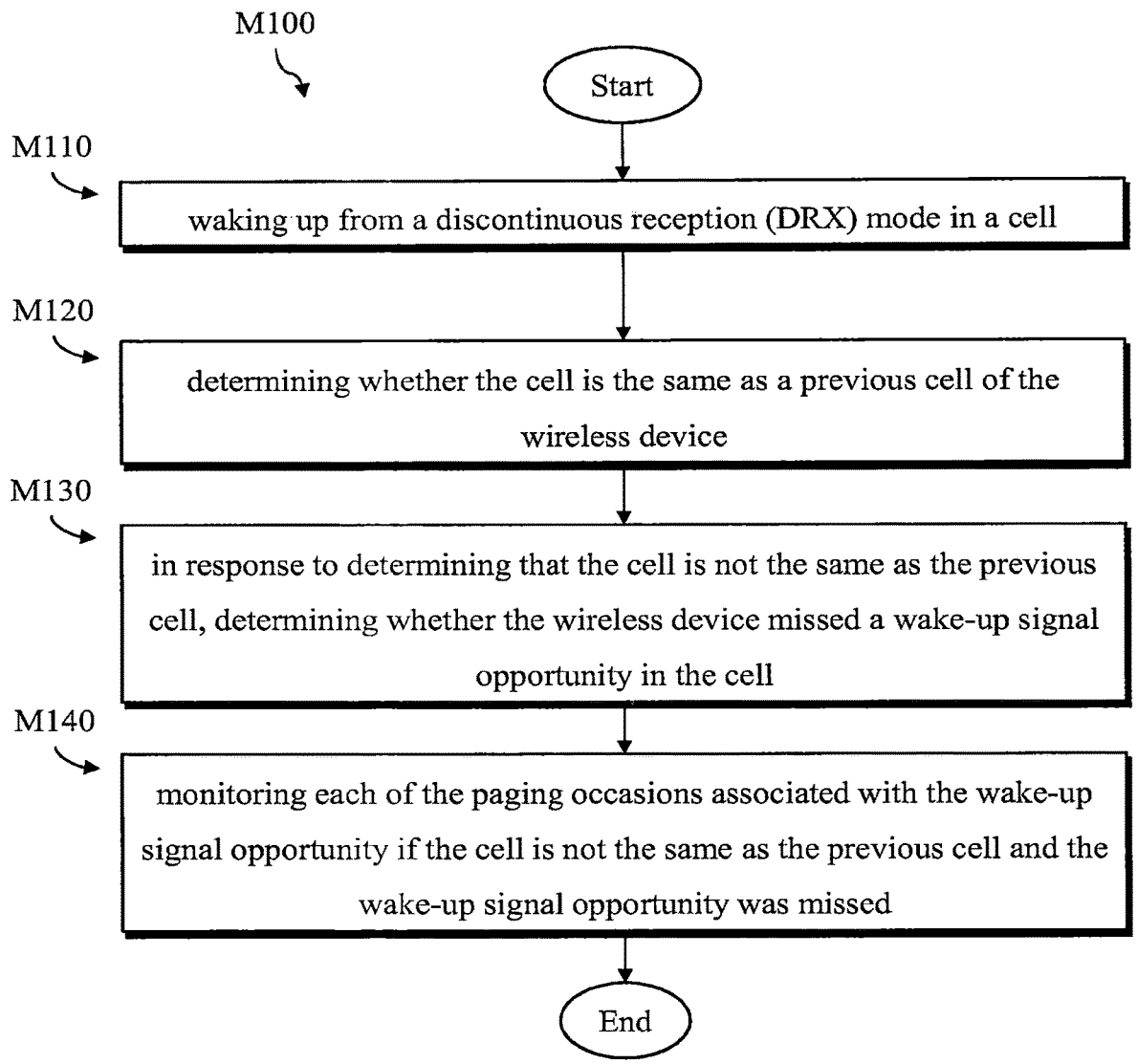
FIG. 13 is a flowchart illustrating another method for use in a wireless device, in accordance with certain embodiments.

FIG. 13 illustrates method M100 for use in a wireless device, in accordance with certain embodiments. Method M100 may begin at step M110, wherein the wireless device wakes up from a discontinuous reception (DRX) mode in a cell. For example, the wireless device may periodically wake up from a DRX mode, such as extended DRX mode, to check for a wake-up signal indicating to the wireless device to change to an active mode to receive one or more transmissions.

Once temporarily woken up, at step M120, the wireless device may determine whether the cell is the same as the previous cell of the wireless device. For example, the wireless device may determine whether it has moved or coverage at its location has changed, thereby requiring the reacquisition of network configuration information, e.g., alignment information. Determining whether the cell is the same as the previous cell of the wireless device may be determined by the wireless device in a variety of ways, using one or more pieces of information obtainable by the wireless device. In some embodiments, determining whether the cell is the same as the previous cell is based on whether the previous cell was the last cell in which the wireless device reported a tracking area update. In some embodiments, determining whether the cell is the same as the previous cell is based on whether the previous cell was the last serving cell of the wireless device. In some embodiments, the cell is the same as the previous cell is based on whether the wireless device is determined to have remained stationary. In this manner, the wireless device may determine whether it has woken up in its previous cell, thereby allowing the wireless device to determine how to monitor for wake-up signals and pages.

In certain embodiments, the wireless device may wake up in the same cell and fail to detect a wake-up signal prior to the paging window. In certain configurations, the wireless device may determine, based on the absence of the wake-up signal, that no paging occasions are relevant to the wireless device. Accordingly, in some embodiments, the wireless device may then abstain from monitoring any paging occasions associated with the paging time window. In this manner, the wireless device may more readily enter back into DRX mode without consuming unnecessary power.

On the other hand, in certain embodiments, the wireless device may wake up in the same cell and detect a wake-up signal prior to the paging time window. In response, the wireless device may monitor each of the paging occasions associated with the paging time window.

If at step M120 the wireless device has determined that the cell is not the same as the previous cell, the method proceeds to step M130. At step M130, it is determined that the wireless device has missed a wake-up signal opportunity in the cell. For example, because the wireless device has woken up in a cell that is not the same as the previous cell, the timing of the paging window and wake-up signaling may be different than the previous cell. The wireless device may determine that based on these differences and the lack of receiving a wake-up signal, that it has missed a wake-up signal opportunity in the new cell. This may be significant if the wireless device is only configured to monitor for a wake-up signal prior to or only once in a paging time window.

In response, method M100 may move to step M140, in which each of the paging occasions associated with the wake-up signal opportunity is monitored if the cell is not the same as the previous cell and the wake-up signal opportunity was missed. This ensures that the wireless device is able to receive a paging message during a monitored paging occasion even if the wake-up signal was missed. In certain embodiments, monitoring each of the paging occasions associated with the wake-up signal opportunity comprises monitoring each of the paging occasions within the paging time window. If no paging message is received by the end of the paging time window, the wireless device may go back to sleep. In some embodiments, monitoring each of the paging occasions associated with the wake-up signal opportunity comprises monitoring one or more of the paging occasions associated with a paging time window according to LTE Release 13.

In certain embodiments, method M100 comprises additional, optional steps. For example, in certain embodiments, method M100 further comprises detecting a wake-up signal during the wake-up signal opportunity and monitoring the paging occasions associated with the wake-up signal. For example, the wireless device may wake up in the same cell or in a different cell without missing the wake-up signal opportunity. In response to detecting the wake-up signal, the wireless device may monitor the paging occasions for information (e.g., paging messages) regarding potential downlink transmissions and/or network configurations applicable to the wireless device. For example, in some embodiments, method M100 further comprises establishing a connection with the cell upon detecting a paging message for the wireless device during the monitored paging occasions.

In certain embodiments, method M100 further comprises re-entering the DRX mode if no paging message is detected during the monitored paging occasions. In this manner, the wireless device may reduce power consumption by limiting the time that the wireless device is awake.

Figure 14:
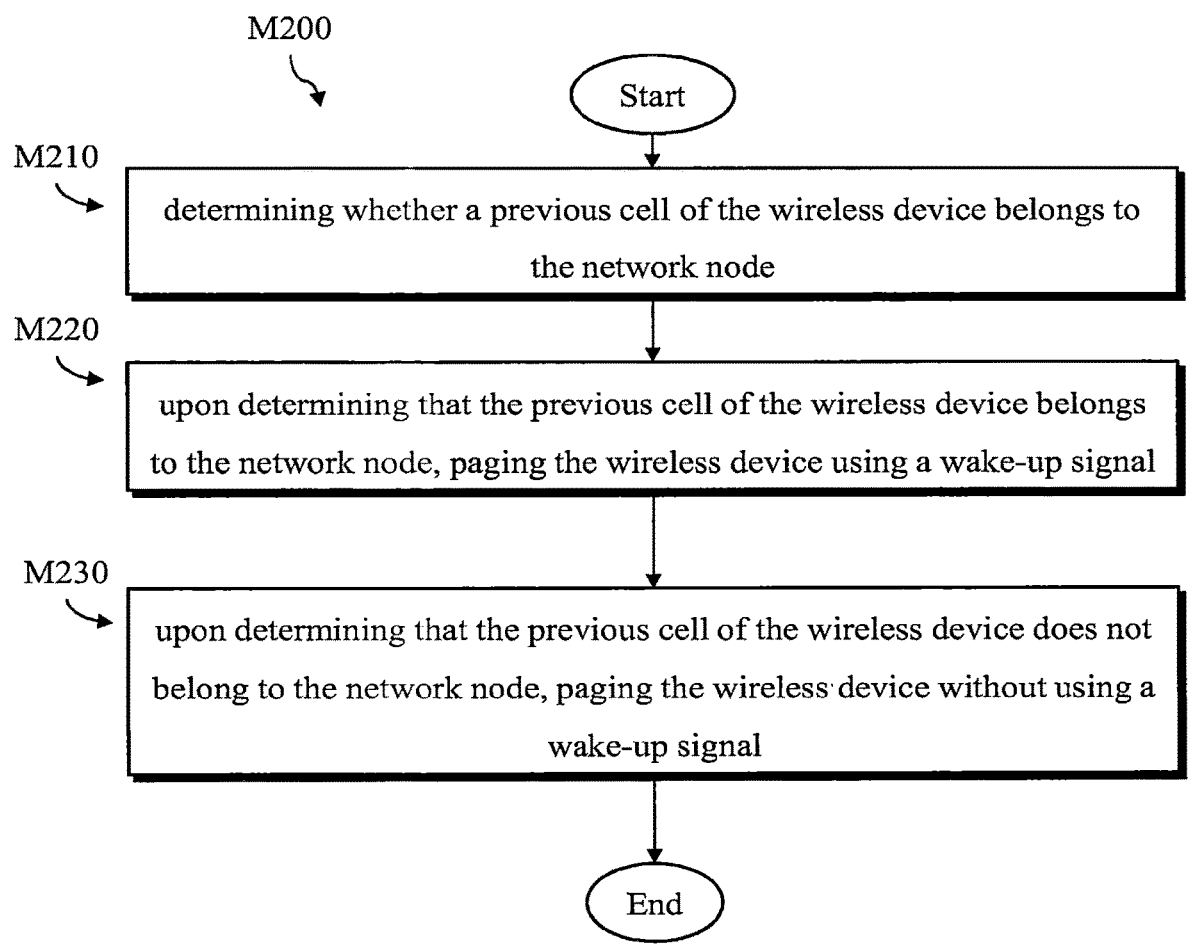
FIG. 14 is a flowchart illustrating a method for use in a network node, in accordance with certain embodiments.

FIG. 14 illustrates method M200 for use in a network node, in accordance with certain embodiments. Method M200 may begin at step M210 with determining whether a previous cell of the wireless device belongs to the network node. For example, the network node may determine a pending transmission to a wireless device within the cell of the network node. The network node may determine from context information obtained about the wireless device whether it was last active or located within the same cell or is now located in a new cell.

Based on the determination made at step M210, the network node may determine how to page the wireless device. At step M220, the network node may page the wireless device using a wake-up signal upon determining that the previous cell of the wireless device belongs to the network node. For example, the timing between the network node and wireless device may be previously established, thereby enabling a single wake-up signal to be used prior to the paging time window to indicate to the wireless device to wake up and monitor the paging occasions. In this way, overhead may be reduced.

At step M230, the network node may page the wireless device without using a wake-up signal upon determining that the previous cell of the wireless device does not belong to the network node. For example, the network node may understand that the wireless device may revert to monitoring each paging occasion if it wakes up in a new cell. The network node may respond by simply sending a paging message to the wireless device during a paging occasion within a paging time window, i.e., without sending the wake-up signal before the paging time window. In some embodiments, the network node may send the paging message in each paging occasion within the paging time window to accommodate the wireless device potentially waking up after the paging time window has already begun. In this manner, method M200 allows the wireless device to be paged successfully regardless if it wakes up in the same cell or in a different cell.

In certain embodiments, method M200 includes further steps. For example, in certain embodiments, method M200 further comprises failing to receive a response to the paging and triggering an escalation of paging such that the paging of the wireless device is performed in additional cells of the network node or other network nodes. In this manner, the network node may ensure that the wireless device is successfully paged.

Modifications, additions, or omissions may be made to any of methods M100 and M200 in FIGURES 13 and 14. Any steps may be performed in parallel or in any suitable order. For example, in certain embodiments, one or more steps of methods M100 and M200 may be repeated. Furthermore, methods M100 and M200 may include more, fewer, or other steps. Additionally, one or more of the steps of methods M100 and M200, or embodiments thereof, may be performed by any suitable component or combination of components of network nodes QQ160, QQ330, QQ412, QQ520 or wireless devices QQ110, QQ200, QQ330, QQ491, QQ492, QQ530, or any other component described herein. In certain embodiments, any of methods M100 and M200 may be implemented using computer readable program code, which may be stored in a computer readable medium and executed by processing circuitry of a wireless device or network node.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A method for use in a wireless device, comprising:
    waking up from a discontinuous reception (DRX) mode in a cell;
    determining whether the cell is the same as a previous cell of the wireless device;
    in response to determining that the cell is not the same as the previous cell, determining whether the wireless device missed a wake-up signal opportunity in the cell; and
    monitoring each of the paging occasions associated with the wake-up signal opportunity if the cell is not the same as the previous cell and the wake-up signal opportunity was missed.

2. The method of claim 1, wherein monitoring each of the paging occasions associated with the wake-up signal opportunity comprises monitoring one or more of the paging occasions associated with a paging time window according to LTE Release 13.

3. The method of claim 1, further comprising:
    detecting a wake-up signal during the wake-up signal opportunity; and
    monitoring the paging occasions associated with the wake-up signal.

4. The method of claim 1, further comprising re-entering the DRX mode if no paging message is detected during the monitored paging occasions.

5. The method of claim 1, further comprising establishing a connection with the cell upon detecting a paging message for the wireless device during the monitored paging occasions.

6. The method of claim 1, wherein determining whether the cell is the same as the previous cell is based on whether the previous cell was the last cell in which the wireless device reported a tracking area update.

7. The method of claim 1, wherein determining whether the cell is the same as the previous cell is based on whether the previous cell was the last serving cell of the wireless device.

8. The method of claim 1, wherein determining whether the cell is the same as the previous cell is based on whether the wireless device is determined to have remained stationary.

9. The method of claim 1, wherein the DRX mode is an extended DRX (eDRX) mode.

10. A wireless device comprising memory operable to store instructions and processing circuitry operable to execute the instructions, whereby the wireless device is operable to:
    wake up from a discontinuous reception (DRX) mode in a cell;
    determine whether the cell is the same as a previous cell of the wireless device;
    in response to determining that the cell is not the same as the previous cell, determine whether the wireless device missed a wake-up signal opportunity in the cell; and
    monitor each of the paging occasions associated with the wake-up signal opportunity if the cell is not the same as the previous cell and the wake-up signal opportunity was missed.

11. The wireless device of claim 10, wherein the wireless device is operable to monitor each of the paging occasions associated with the wake-up signal opportunity comprises monitoring one or more of the paging occasions associated with a paging time window according to LTE Release 13.

12. The wireless device of claim 10, wherein the wireless device is further operable to:
    detect a wake-up signal during the wake-up signal opportunity; and
    monitor the paging occasions associated with the wake-up signal.

13. The wireless device of claim 10, wherein the wireless device is further operable to re-enter the DRX mode if no paging message is detected during the monitored paging occasions.

14. The wireless device of claim 10, wherein the wireless device is further operable to establish a connection with the cell upon detecting a paging message for the wireless device during the monitored paging occasions.

15. The wireless device of claim 10, wherein determining whether the cell is the same as the previous cell is based on whether the previous cell was the last cell in which the wireless device reported a tracking area update.

16. The wireless device of claim 10, wherein determining whether the cell is the same as the previous cell is based on whether the previous cell was the last serving cell of the wireless device.

17. The wireless device of claim 10, wherein determining whether the cell is the same as the previous cell is based on whether the wireless device is determined to have remained stationary.

18. The wireless device of claim 10, wherein the DRX mode is an extended DRX (eDRX) mode.

19. The wireless device of claim 10, wherein the wireless device is further operable to abstain from monitoring any paging occasions associated with the paging time window if the cell is the same as the previous cell and no wake-up signal was detected prior to the paging time window.

20. The wireless device of claim 10, wherein the wireless device is further operable to monitor each of the paging occasions associated with the paging time window if the cell is the same as the previous cell and the wake-up signal was detected prior to the paging time window.

* * * * *